Feb. 5, 1963 G. E. OWEN, JR., ETAL 3,076,873

AMPLIFIER SYSTEM

Filed June 25, 1959 2 Sheets-Sheet 1

INVENTORS
George E. Owen Jr.
BY Norman W. Parker
Mueller & Aichele
Attys.

INVENTORS.
George E. Owen Jr.
Norman W. Parker
BY Mueller & Aichele
Attys.

3,076,873

AMPLIFIER SYSTEM

George E. Owen, Jr., Melrose Park, and Norman W. Parker, Wheaton, Ill., assignors to Motorola, Inc., Chicago, Ill., a corporation of Illinois Filed June 25, 1959, Ser. No. 822,780
5 Claims. (Cl. 179—100.1)

This invention relates to stereophonic sound signal translating and utilization apparatus which is particularly adapted for the reproduction of stereophonic disk recordings.

Many present day sound reproducing systems achieve a depth or realism in the reproduction by using two or more spaced sound reproducers, for example loudspeakers, with each reproducer simultaneously providing the sound as it existed in the original performance at different spaced locations. These different sounds at spaced locations occur in much recorded material which does not consist of a stationary point source of sound. Thus, these differing sounds can be separately recorded in different record channels and then played back individually by spaced sound reproducers in order to provide a realistic overall sound pattern for a listener.

Prior record playing equipment of the above type generally employed two complete amplifier channels, one channel translating signals representing sound to the right of a performance area and one amplifier channel translating signals representing sound to the left of the performance area. These two signals were then amplified and applied to associated right and left reproducer assemblies. Such a system necessitates the use of two complete amplifier channels having equally desirable signal handling capabilities so that one half of the signal pattern which the listener experiences is not inferior in reproduction fidelity to the other half of the pattern.

An object of this invention is to provide stereophonic sound signal translating apparatus wherein one of the signal channels can be constructed with less stringent design requirements without material adverse influence of the overall system performance.

Another object is to provide stereophonic signal translating apparatus in which a signal representing the major portion of the total signal information is translated by an amplifier producing minimum deterioration of the signal and in which apparatus a signal representing the relatively minor portion of the information, at low power and within a limited frequency range, is translated by an amplifier of limited design refinement thereby maximizing utilization capabilities of two amplifier channels of the system.

Another object is to reduce the cost and simplify the design of stereophonic phonograph record playing apparatus.

A still further object is to provide stereophonic record playing apparatus adapted to use a pick-up cartridge of simple and inexpensive design.

A feature of the invention is the provision of stereophonic signal translating apparatus wherein the so-called right and left input signal components are combined to form sum and difference signal combinations and these signal combinations are amplified in different channels, with the sum signal combination translated in a high power amplifier having a full frequency range and the difference signal combination translated in a relatively low power amplifier of limited frequency range, so that suitable additive and subtractive matrixing of the amplifier outputs will produce the individual right and left signals for reproducer means.

Another feature is the provision of a stereophonic sound signal amplifier having a first amplifier channel with a push-pull output stage and a full frequency response range for translating a signal combination representing the summation of two separate stereo signal components and which amplifier further has a second amplifier channel with a single ended output stage and only a high frequency response range for translating a signal combination representing the difference of the two separate stereo signal components.

Still another feature of the invention is the provision of such a stereophonic signal amplifier adapted for playing disk records having a V groove with different stereo signal components represented in variations of the groove sides and wherein a vertical-lateral type pick-up cartridge is used with the sensing portion of the cartridge responsive to vertical groove variations deriving the difference signal combination and the lateral movement sensing portion of the cartridge responsive to lateral groove variations is used to derive a sum signal combination.

A further feature of the invention is the provision of a matrixing speaker circuit for stereophonic signal components represented by the sum and difference signal combinations of stereo components wherein the sum signal components are applied to a centrally positioned low frequency reproducer and additional combinations of the sum and difference signal combinations are applied to reproducers positioned on either side of the low frequency reproducers in order to provide higher frequency audio signals for effective stereophonic sound reproduction.

In a particular form of the invention a vertical-lateral phonograph pick-up cartridge is used to derive difference and sum signal combinations from a disk record having a V groove with the stereo signals, that is the so-called right and left signal components, individually represented by variations in the sides of the groove. The sum signal combination is amplified by a high power amplifier having full frequency response and a push-pull output stage for improved spurious signal response characteristics. The difference signal combination is translated by a low power amplifier having a frequency response above several hundred cycles per second. The two signal combinations are then added and subtracted in a matrix network for associated loudspeakers so that the speakers are energized individually by the original right and left signals containing the stereo sound information. In a modified form of the speaker matrixing network, the low frequency components from both the right and left stereophonic signal components are applied to a centrally positioned loudspeaker and the higher frequencies, carrying the greater part of the information for the stereophonic effect, are applied as recovered right and left signal components to respective loudspeakers positioned on either side of the centrally positioned speaker.

Figures 1, 2, 3:
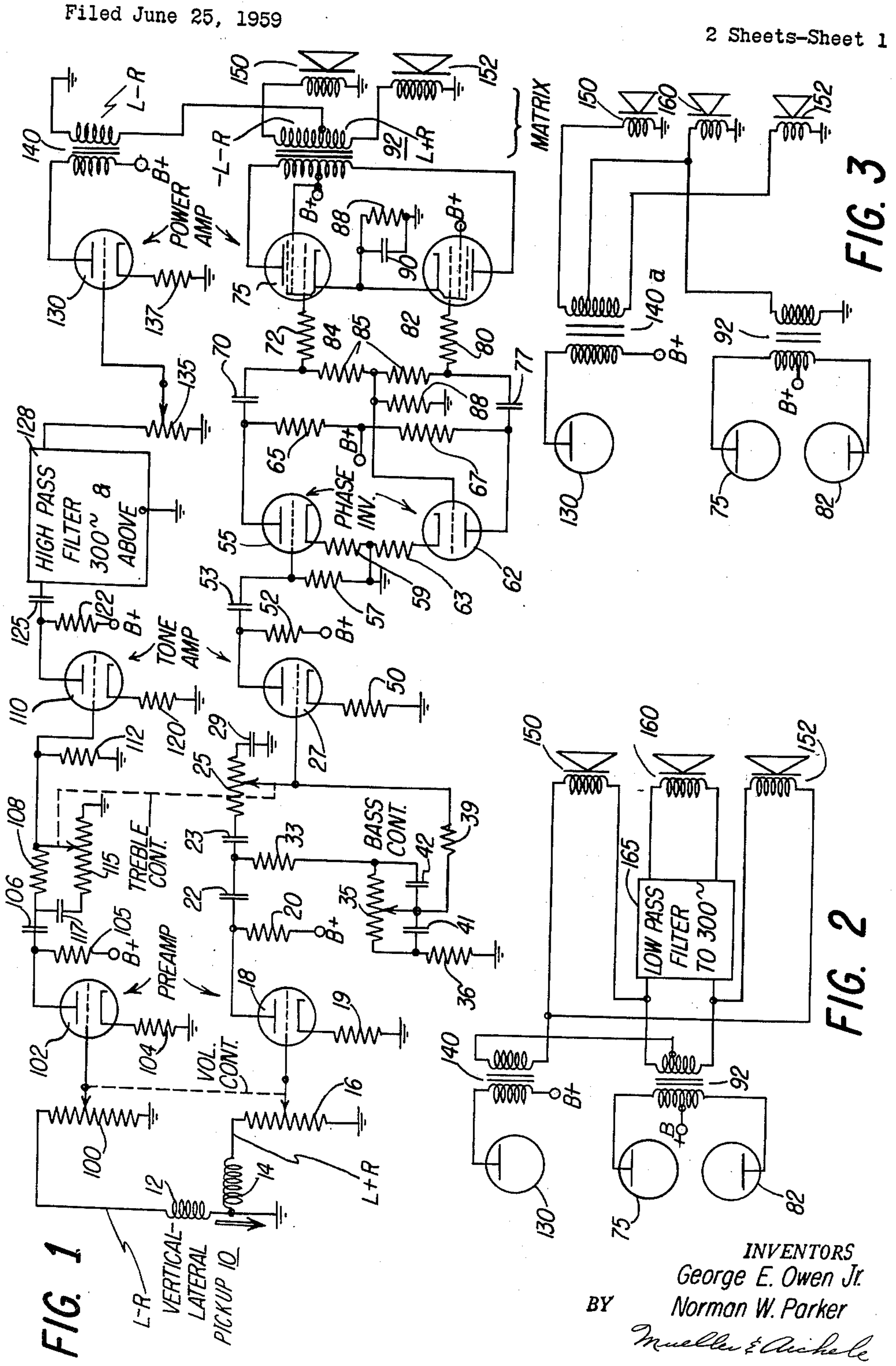
FIG. 1 is a schematic representation of a stereophonic disk record reproducing system constructed in accordance with the invention.
FIG. 2 is an alternate circuit for a speaker matrixing system for the circuit of FIG. 1.
FIG. 3 is still another form of a speaker matrixing circuit for the system of FIG. 1.

In the drawing of FIG. 1 there is a vertical-lateral pickup cartridge 10 having a vertical coil 12 which develops signals upon vertical motion of an associated needle and a horizontal coil 14 which develops signals upon lateral movement of the needle. In present day disk records of the so-called 45–45 type the sides of a V-groove in the record are disposed at 45° angles to the record plane and the so-called right and left stereophonic signal components are represented as respective amplitude variations of the side walls of this groove at right angles thereto. Normally the phase of one of the right or left signal components is reversed so that variations of the V groove side walls corresponding to the same instantaneous values of both of the signals are represented by variations of the V groove wall in opposite directions. Thus, a cartridge such as cartridge 10 when used as a transducer for the 45–45 type records will provide a signal across the vertical coil 12 which corresponds to the difference of the left and right signal components and a signal across the lateral coil 14 which corresponds to the summation of the left and right signal components.

The sum signal combination is applied across the fixed portion of volume control resistor 16 which has a variable arm connected to the control grid of preamplifier triode tube 18. Cathode bias for tube 18 is provided by resistor 19 and the anode of this tube is connected to B+ through the load resistor 20. The output signals therefrom are applied through a D.C. blocking capacitor 22 and a low frequency blocking capacitor 23 to one side of the variable resistor 25, which is a treble tone control. The arm of resistor 25 is connected to the control grid of tone amplifier triode tube 27. The other side of resistor 25 is bypassed to ground through capacitor 29.

The lower frequency components of the signal, which are not passed effectively by capacitor 23, appear across the series combintaion of resistor 33, variable resistor 35 and fixed resistor 36. A variable arm of resistor 35 is coupled through resistor 39 to the control grid of tube 27. The ends of resistor 35 are coupled respectively through capacitors 41 and 42 to the variable arm of this resistor.

The variable resistor 35 is a base control and is isolated from the treble control resistor 25 by means of resistors 33 and 39. When the variable arm of resistor 35 is moved to the right in FIG. 1 a relatively large amount of the lower frequency signal components are developed across resistors 35 and 36 to be applied to tube 27. The higher frequencies are bypassed by means of capacitor 41. With the variable arm of resistor 35 moved to the left of FIG. 1, a lesser percentage of the low frequency signal components which appear across resistor 36 are applied to tube 27 and capacitor 42 tends to couple a small amount of the higher frequency component thus tending to compensate for signal losses in the base control network.

Variable treble control resistor 25 serves to shunt a portion of the higher frequency components through capacitor 29 so that the high frequency components are translated at maximum when the arm of resistor 25 is moved to the left and these components are translated at minimum when the variable arm of the control is moved to the right.

Cathode bias for triode tube 27 is provided by resistor 50 and a plate load resistor is coupled between the anode of tube 27 and B+. The anode of tube 27 is coupled through the D.C. blocking capacitor 53 to the control grid of the phase inverter triode tube 55. The input signals to tube 55 are developed across the resistor 57 connected between the control grid and ground.

In the phase inverter stage cathode bias for tube 55 is developed across a resistor 59 and cathode bias for phase inverter triode tube 62 is developed across resistor 63. The anode of tube 55 is coupled through load resistor 65 to B+ and the anode for tube 62 is coupled through load resistor 67 to B+. A D.C. blocking capacitor is connected between the anode of tube 55 and through suppressor resistor 72 to the control grid of pentode tube 75. The anode of tube 62 is coupled through the D.C. blocking capacitor 77 and through suppressor resistor 80 to the control grid of pentode tube 82. Capacitors 70 and 77 are interconnected to resistors 84 and 85 and the junction of these resistors is returned to the control grid of triode tube 62 to provide a phase reversed drive signal for this tube. The input signal for tube 62 is derived across the resistor 88 connected between its control grid and ground.

The signals from the phase inverter tubes 55 and 62 are exactly alike and 180° out of phase, as will be understood by those skilled in this art. The power amplifier stage for this channel utilizes pentodes 75 and 82 connected in push-pull. The cathode bias for these tubes is provided by resistor 88 and this resistor is bypassed at signal frequencies by the capacitor 90. The screen grids of the pentode tubes 75 and 82 are coupled to B+ and the anodes of these tubes are connected to the respective ends of the primary winding of output transformer 92. A center tap of this primary winding is also coupled to B+ for energizing the tubes 75 and 82. It should be understood that the secondary winding of transformer 92 is also center tapped and that the sum signal combination, that is the signal composed of the summation of the left and right stereophonic signal components, will be developed on both sides of the center tap of this secondary winding and that the two output signals on either side of this center tap will be 180° out of phase.

Returning now to a detailed description of the second amplifier channel in the system, it will be noted that the vertical pick-up coil 12 is coupled across the volume control resistor 100 and that the signals across this resistor will represent the difference between the left and right stereophonic signal components. A variable arm of resistor 100 is connected to the grid of the preamplifier triode tube 102 and the cathode of this tube is coupled to ground through a cathode bias resistor 104. The variable arms of volume control resistors 16 and 100 may be ganged in order to provide simultaneous volume control in the two signal channels. The anode of tube 102 is coupled through the output load resistor 105 to B+. The output signals from tube 102 are derived at the anode and applied through D.C. blocking capacitor 106 and resistor 108 to the control grid of the tone amplifier triode tube 110. An input load resistor for the control grid of tube 110 is coupled between this grid and ground. A treble control resistor 115 is connected through capacitor 117 to the junction of capacitor 106 and resistor 108 and the other side of resistor 115 is coupled to ground. A variable arm of treble control resistor 115 is coupled to the junction of resistors 108 and 112. The variable arm of treble control resistor 115 may be conveniently ganged to the variable arm of treble control resistor 25 for simultaneous variation of the higher frequency components in the two signal channels. Variation in the high frequency response of the signals applied to tube 110 is effected by varying resistor 115 and bypassing a greater or lesser amount of the higher frequency components around series resistor 108 by means of the capacitor 117.

The cathode of the triode tube 110 is biased by means of resistor 120 and the output signals from this tube are developed across the anode load resistor 122. A D.C. blocking capacitor 125 is coupled between the anode of tube 110 and the input to a high pass filter 128. The high pass filter is coupled to ground and also to the control grid of the power amplifier triode tube 130. Filter 128 passes the higher frequency signal components in a range above several hundred cycles per second. The low frequency cut off point of this filter is preferably in the range of 300–500 cycles.

The input signals for triode tube 130 are developed across variable resistor 135 which has an arm coupled to the control grid of this tube. Cathode bias is provided by means of resistor 137 and the output signals from tube 130 are developed across the primary winding of output transformer 140 which is coupled between the anode and B+. It will be noted that the signals appearing across the secondary winding of output transformer 140 will be the difference of the left and right stereophonic signal components as applied to the input of this amplifier channel.

A combination of the signals from the two amplifier channels are applied to the right loudspeaker 150 and the left loudspeaker 152 by means of a matrix circuit arranged so that only the right stereophonic signal component is applied to speaker 150 and only the left signal component is applied to speaker 152. Speakers 150 and 152 are intended to be positioned respectively to the right and left of a listener. The signal matrixing is accomplished by connecting the speakers individually to the ends of the secondary winding of output transformer 92 and connecting the center tap of the secondary windings in series with the secondary winding of the transformer 140 and to the interconnection of the speakers 150 and 152. In such an arrangement the signals will be added to provide cancellation of the so-called left signal components in the signal applied to speaker 150 and cancellation of the so-called right signal components in the signal applied to speaker 152. It will be understood by those familiar with this art that the signs applied to the signals as designated herein are only relative and in any given instance the signs need only be made to correspond relative to one another and that the practical method of establishing a signal with a proper overall sign is to merely connect the transformer winding across which it is developed with the proper polarity.

In the circuit of FIG. 1 it should be noted that the relatively high power signal channel, namely that carrying the $L+R$ signal, or sum of the left and right signal components, includes a push-pull output stage in order to secure desirable reduction of harmonic components and that the output transformer of the stage can be of a relatively high quality since this channel is conducting the full high and low frequency range of the overall composite signal. However, the signal channel carrying the $L-R$ signal, or difference signal combination, need only pass the relatively high frequency components of the two (left and right) stereophonic signal components and this channel can be of relatively low power and use inexpensive circuit components. For example, the power amplifier need only include a single tube 130 and the transformer 140 may be of a comparatively inexpensive construction since the frequency range is limited and the power handling requirements are limited due to the fact that a lesser degree of stereophonic information is carried in the difference signal combination.

Furthermore the system makes advantageous use of the vertical-lateral pick-up cartridge 10. The so-called turntable "rumble," which takes the form of a spurious low frequency signal due to the record turntable apparatus and is generally a low frequency signal which appears to a great extent in the vertical movement of the pick-up cartridge, can be eliminated because the signals represented by vertical movement of the cartridge pick-up element are translated through an amplifier channel passing only the higher frequencies which rejects the low frequency "rumble." Thus it should be apparent that in the construction of the cartridge 10 only the lateral pick-up provision need be designed with stringent engineering specifications and the vertical component response can be constructed with wider engineering design tolerance.

Resistor 135 is made variable in order to control the signal amplitude or gain in one channel with respect to the other. When such a control is used in the circuit ahead of the matrix, it has the effect changing the vectorial angle representing the separate right and left signals with respect to the walls of the record groove. Thus, varying the amplitude of the signal from the vertical pickup coil 12, while maintaining a signal from the lateral pickup coil 14 at constant amplitude, varies the amount of vertical signal components derived from the walls of the record groove as compared to the lateral components so derived. Compensation can thereby be effected for imperfect match of the vertical-lateral cartridge to particular 45–45 records caused, for example, by an exact forming of the angle of the record groove wall at angles other than 45° or wearing of the record groove in the vertical direction through use.

In the modification of FIG. 2 the matrix circuit includes a provision for adding a center speaker 160 which would be positioned midway between the left speaker 152 and the right speaker 150. The speakers 150 and 152 are connected as previously described. However, speaker 160 is coupled across the ends of the secondary winding of output transformer 92 through a low pass filter 165. Filter 165 would pass signals in a frequency range up to several hundred cycles, for example, up to three hundred cycles per second. The advantage of a system of this type is that the speakers 150 and 152 may be relatively small, low power speakers, or tweeters, for reproducing the higher frequency components in the right and left channels. These higher frequency components account for the essential part of the overall stereophonic sound pattern since these signals display the greatest directional properties. The center speaker 160 may be a relatively large high powered speaker, or woofer, for reproducing the lower frequency components from both the right and left channels. It has been found that these lower frequency signals do not exhibit great directional properties and that having the low frequency signals of both the right and left channels come from the same reproducer will not adversely influence the overall stereophonic effect produced by the system.

In the modification of FIG. 3 the speaker matrixing system has a common interconnection for the right and left speakers as well as the center speaker. This permits grounding one side of each speaker which may be an advantage where long speaker leads are required in any given system. In this form the output matrix utilizes a center tapped secondary winding for the output transformer 140*a* and a secondary winding of transformer is not center tapped. As in the circuit of FIG. 2 the center speaker 160 is coupled across the secondary winding of transformer 92 so that this reproduces the low frequency components in the sum signal component channel, since these low frequency components do contribute materially to the stereophonic effect. One half of the secondary winding of transformer 140*a* develops a difference signal of one sign which is added to the summation signal across the secondary winding of transformer 92 and applied to the speaker 150 to produce the "right" signal components. The other side of the secondary winding of transformer 140*a* produces a difference signal of opposite sign and this is added to the summation signal appearing across the secondary of transformer 92 and these signals are combined and applied to the speaker 152 to form a "left" signal. Thus, this matrix system is similar in the overall result obtained to that of FIG. 2 except that the position of the two transformer secondary windings in the matrix have been reversed.

As previously discussed in connection with variable resistor 135, it is possible to correct for mismatch of the record groove angle and the cartridge signal pickup angle by varying the gain in one of the channels ahead of the matrix system. However, this method of correction is primarily to correct for an error of the type where the two walls of the record groove are at the same angle to the horizontal and something other than 45°. For example, where both of the record groove walls might be at 40° instead of 45°, the correction with variable resistor 135 could be made to compensate and produce output signals which are comparable to results obtained using a 45–45 record. However, when there is a mismatch of cartridge angle and the record is not symmetrical, other means must be used for correcting the defect.

Figures 4, 5:
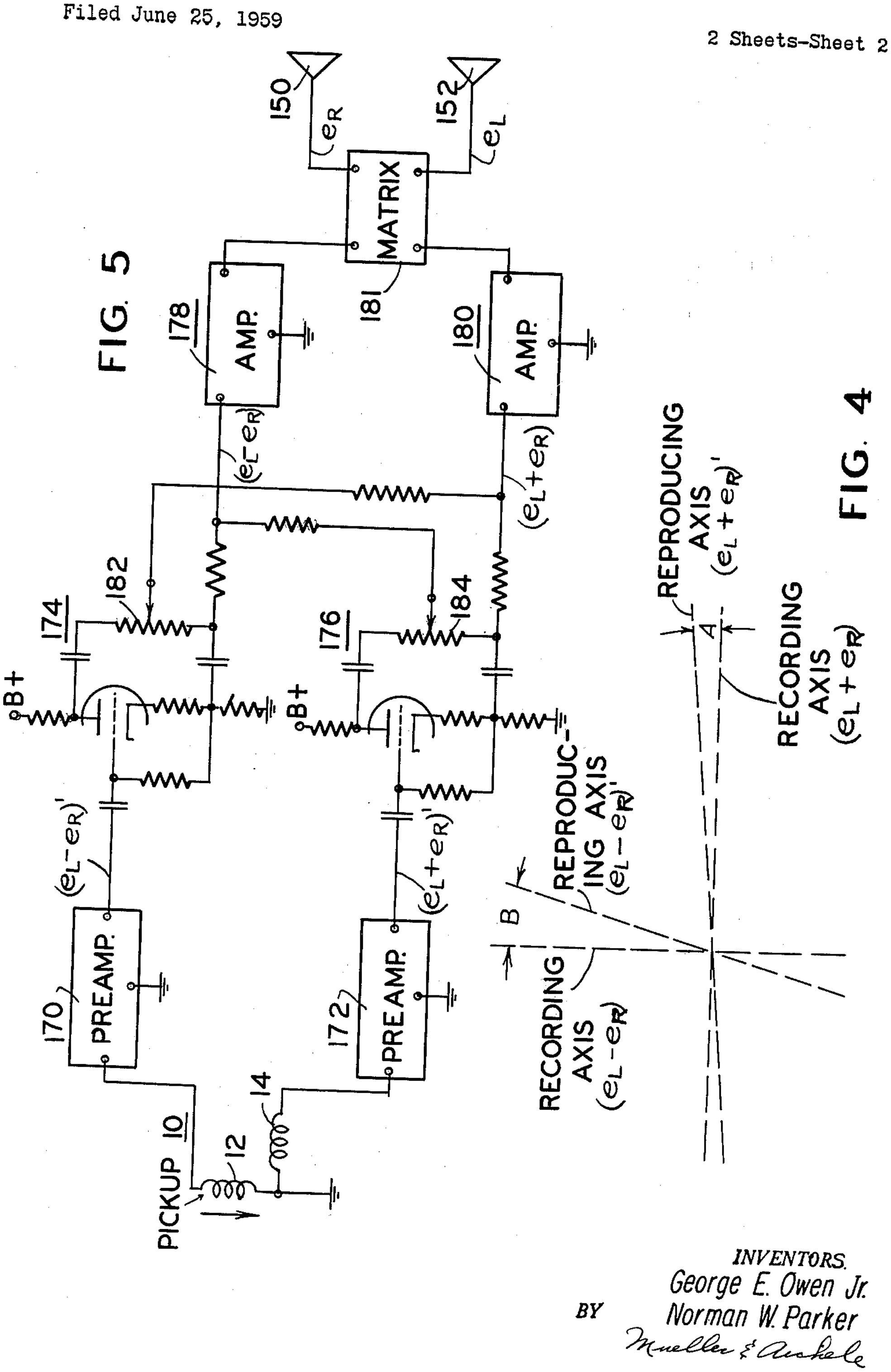
FIG. 4 is a diagram useful in explaning another modification of the invention.
FIG. 5 is a diagram of a correction circuit for use in the system of the invention.

In FIG. 4 there is shown diagrammatically a lateral recording axis from which the summation signal $L+R$ would be derived in the lateral pickup coil 14. There is also shown a vertical recording axis from which the difference signal $L-R$ would be derived by the vertical pickup coil 12. In other words, these two recording axes represent two right angle axes of the information as it is recorded on a record disk. Assuming now a physical displacement or rotation of the pickup device such that the angle at which signals are actually derived from the record is displaced by an angle A, the reproducing axis for the summation signal thus displaced will result in a distorted signal designated as $(e_L+e_R)'$. Similarly, if the vertical portion of the signal pickup device is further mismatched to the record, the angle at which the $L-R$ difference signal is derived will be displaced by an angle B. In this situation the difference signal includes distortion components and is represented as $(e_L-e_R)'$. Thus it may be seen that both of the derived sum and difference signals contain undesired components, with the sum signal containing undesired vertical components and the difference signal containing undesired horizontal components. It should be noted that angle B is shown extending in a clockwise direction from the recording axis and angle A is shown extending in a counterclockwise direction from the lateral recording axis, although it will be recognized that these angles may extend in either direction from the recording axes and that they may be the same or different in value.

FIG. 5 shows the circuitry for correcting either or both of the recording and reproducing apparatus mismatches as illustrated in FIG. 4. The vertical signal components from the coil 12 representing the difference or $L-R$ signals are applied to the preamplifier 170 and the signals from lateral coil 14 representing the summation or $L+R$ signals are applied to the preamplifier 172. It will be assumed that each of these signals contain slight undesired amounts of the other due to the mismatch error angles A and B as discussed. The difference signal from amplifier 170 is applied to a phase inverter 174 and the sum signal from amplifier 172 is applied to a phase inverter 176. The output of phase inverter 174 is applied to the power amplifier 178 and the output of the amplifier 176 is applied to the power amplifier 180. The signals are thus coupled to matrix 181 for addition and subtraction as previously discussed. Resultant R and L signals are then applied to speakers 150, 152.

Amplifiers 174 and 176 also include respective potentiometers 182 and 184 having variable arms so that a portion of the signals in each of the two channels can be tapped off. These signals available at potentiometers 182 and 184 can be of either phase and any amplitude depending on the setting of the potentiometer arms since the signals are developed across the phase inverter stages 174 and 176. The variable arm of potentiometer 182 is coupled to the input to the power amplifier 180 and the variable arm of potentiometer 184 is coupled to the input of power amplifier 178. Accordingly, by cross-coupling a small portion of the signal from each channel into the other and by having the signal so cross-coupled of the opposite phase to that of the error or distortion signal in each channel, it is possible to cancel the error or distortion signal in each channel so that the amplifiers 178 and 180 are essentially driven by the difference signal, or $L-R$, and the sum signal, or $L+R$, with virtually no resultant error signal from the other channel.

Accordingly, even though the pickup cartridge 10 is not precisely physically oriented to match the recording axis in any given record, it is possible to compensate for the errors introduced and thus effectively electrically rotate the cartridge by adjustment of potentiometers 182 and 184. It will be understood that the various stages and characteristics of the system of FIG. 5 may correspond with those of the system of FIG. 1 and that FIG. 5 is intended to illustrate the general application of correction signals for both channels, whereas in practice the actual correction may only be made for one of the channels.

This invention provides therefore stereophonic signal translating apparatus which may be constructed at less cost and with less size and weight than previously known systems which require two complete signal handling channels of equal design specifications. Furthermore, the system permits the use of the very advantageous push-pull output circuit which translates the material part of the overall information with a minimum of spurious signal introduction. The system also tends to minimize spurious signals developed in the mechanical system of the record turntable and the pickup cartridge. Thus, the cartridge used with this system may be of comparatively inexpensive and simple construction without sacrificing overall performance in the end result produced by the system.

We claim:

1. Stereophonic signal reproducing apparatus for utilizing a right signal component and a left signal component representing stereophonic sound energy, said apparatus including in combination, pickup means including a first input circuit portion providing the first composite signal representing the difference between the right and left signal components and a second input circuit portion providing a second composite signal representing the summation of the right and left signal components, first amplifier means coupled to said first input circuit portion and having a frequency pass characteristic in a frequency range in which substantially all of the stereophonic information occurs and having a relatively low power single ended output amplifier stage, second amplifier means coupled to said second input circuit portion and having a frequency pass characteristic extending in a range both within and below the aforementioned frequency range and further having a relatively high power push-pull output amplifier stage, first and second loudspeaker means, a matrix circuit connected between said first and second amplifier means and said first and second loudspeaker means so that said loudspeaker means are energized individually by the left signal component and the right signal component as translated by said first and second amplifier means and by signals below said frequency ranges translated by said second amplifier means and a variable level control connected to said amplifier means for adjusting the balance between signals translated by said first and second amplifier means to control stereophonic signal separation in said first and second loudspeaker means.

2. Stereophonic record playing apparatus for utilizing a 45–45 type phonograph record with first and second stereo signal components represented in a V groove thereof, said apparatus including in combination a vertical-lateral pickup cartridge having a first circuit portion responsive to vertical variation in the V groove to provide a first composite signal representing the difference between the first and second signal components and further having a second circuit portion responsive to lateral variation in the V groove to provide a second composite signal representing the summation of the first and second signal components, a first amplifier circuit coupled to said first circuit portion of said cartridge and being constructed of components providing reduced low frequency response so that the same has a frequency translation characteristic extending above 300 cycles per second, said first amplifier circuit having a single ended output stage and output impedance means for developing signal components translated thereby, a second amplifier circuit coupled to said second circuit portion of said cartridge and having a frequency translation characteristic extending above and substantially below 300 cycles per second, said second amplifier circuit having a push-pull output stage and output impedance means for developing signal components translated thereby, one of said output impedance means having end terminals for connection thereto, the other of said output impedance means having end terminals and a center tap for connection thereto, said center tap being coupled to an end terminal of said one output impedance means, and a signal utilization matrix including first and second loudspeakers interconnected to the other end terminal of said one output impedance means and individually coupled to said end terminals of said other output impedance means so that one loudspeaker is energized by the summation of the first and second composite signals and the other loudspeaker is energized by the difference of the first and second composite signals.

3. Stereophonic record playing apparatus for utilizing a 45–45 type phonograph record with first and second stereo signal components represented in a V groove thereof, said apparatus including in combination a vertical-lateral pickup cartridge having a first circuit portion responsive to vertical variation in the V groove to provide a first composite signal representing the difference between the first and second signal components and further havinng a second circuit portion responsive to lateral variation in the V groove to provide a second composite signal representing the summation of the first and second signal components, a first amplifier circuit coupled to said first circuit portion of said cartridge and having a frequency translation characteristic extending above a frequency of the order of 300 cycles per second, said first amplifier circuit having output impedance means for developing signal components translated thereby, a second amplifier circuit coupled to said second circuit portion of said cartridge and having a frequency translation characteristic extending above and substantially below 300 cycles per second, said second amplifier circuit having output impedance means for developing signal components translated thereby, one of said output impedance means having end terminals for connection thereto, the other of said output impedance means having end terminals and a center tap for connection thereto, said center tap being coupled to an end terminal of said one output impedance means, first and second loudspeakers interconnected to the other end terminal of said one output impedance means and individually coupled to said end terminals of said other output impedance means so that one loudspeaker is energized by the summation of the first and second composite signals and the other loudspeaker is energized by the difference of the first and second composite signals, low pass filter means, and a third loudspeaker coupled through said low pass filter means to said output impedance means of said second amplifier circuit.

4. Stereophonic record playing apparatus for utilizing a record having right and left stereo signal components represented therein, said apparatus including in combination, pickup means for deriving the right and left stereo signal components from the record, first and second amplifier means coupled to said pickup means, said first amplifier means having a frequency pass characteristic in a frequency range providing substantially all of the stereophonic information and having a relatively low power single ended output amplifier stage, said second amplifier means having a frequency pass characteristic extending in a range both within and below the aforementioned frequency range and further having a relatively high power push-pull output amplifier stage, output circuit means coupled to said first and second amplifier means, and first, second and third loudspeakers, said first and second loudspeakers being constructed to reproduce only high frequency audio signals representing the stereophonic information, circuit means connecting said first and second loudspeakers to said output circuit means for respective energization thereof by the right and left stereo signal components, means for limiting reproduction of signals by said third loudspeaker to audio signals in the bass range to the exclusion of the high frequency audio signals representing the stereophonic information and further circuit means connecting said third loudspeaker to said second amplifier means through said output circuit means, so that positioning of said third loudspeaker intermediate said first and second loudspeaker provides an overall sound pattern including high frequency stereophonic audio information and low frequency audio information.

5. Stereophonic record playing apparatus for utilizing a 45—45 type phonograph record with first and second stereo signal components represented in a V groove thereof, said apparatus including in combination a vertical-lateral pickup cartridge having a first circuit portion responsive to vertical variation in the V groove to provide a first composite signal representing the difference between the first and second signal components and further having a second circuit portion responsive to lateral variation in the V groove to provide a second composite signal representing the summation of the first and second signal components, a first amplifier circuit coupled to said first circuit portion of said cartridge and having a frequency translation characteristic extending through a given range, said first amplifier circuit having output impedance means for developing signal components translated thereby, a second amplifier circuit coupled to said second circuit portion of said cartridge and having a frequency translation characteristic extending through and below the aforesaid given range, said second amplifier circuit having output impedance means for developing signal components translated thereby, one of said output impedance means having end terminals for connection thereto, the other of said output impedance means having end terminals and a center tap for connection thereto, said center tap being coupled to an end terminal of said one output impedance means, variable means in said first amplifier circuit for electrically correcting record and pickup mismatch, and a signal utilization matrix including first and second loudspeakers interconnected to the other end terminal of said one input impedance means and individually coupled to said end terminals of said other output impedance means so that one loudspeaker is energized by the summation of the first and second composite signals and the other loudspeaker is energized by the difference of the first and second composite signals.

References Cited in the file of this patent

UNITED STATES PATENTS

| | | |
|---|---|---|
| 2,273,866 | Holst et al. | Feb. 24, 1942 |
| 2,336,276 | Van der Meulen | Dec. 7, 1943 |
| 2,698,379 | Boelens et al. | Dec. 28, 1954 |
| 2,845,461 | Bertram | July 29, 1958 |
| 2,851,532 | Crosley | Sept. 9, 1958 |
| 2,904,632 | Levy | Sept. 15, 1959 |
| 2,922,848 | Miller | June 26, 1960 |
| 2,958,738 | Gray | Nov. 1, 1960 |

OTHER REFERENCES

"New for the Audiophile," by Herman Burstein, Radio Electronics, pp. 38 and 39, April 1958.

"2-Way Stereo Amplifier," by B. B. Bauer et al., Radio Electronics, pp. 41 and 42, December 1958.

"Single Push-Pull Stage for Both Stereo Channels," by N. H. Crowhurst, Radio and TV News, pp. 48, 49 and 146–149.

"Using AM/FM Multiplex," by A. E. Sweeney, Electronics, May 8, 1959, vol. 32, #19, pp. 57 and 58.

"Adding the Third Channel," High Fidelity Magazine, April 1959, pp. 109, 125 and 126.